UNITED STATES PATENT OFFICE.

THEODOR KNÖSEL, OF NEUSTADT, GERMANY.

FERTILIZER AND PROCESS OF MANUFACTURING THE SAME.

1,108,189.  Specification of Letters Patent.  Patented Aug. 25, 1914.

No Drawing. Application filed December 13, 1910. Serial No. 597,123.

*To all whom it may concern:*

Be it known that I, THEODOR KNÖSEL, civil engineer, a subject of the King of Saxony and the German Emperor, residing at Neustadt, in the Province of West Prussia, Kingdom of Prussia, German Empire, have invented a new and useful Improvement in Fertilizers and Processes of Manufacturing the Same; and I do hereby declare the following to be a full, clear, and exact description of the same.

The subject-matter of this invention is a fertilizer containing lime nitrogen (calcium cyanamid) and process of manufacturing the same.

The fertilizer consists of lime nitrogen (calcium cyanamid) and waste lyes of the sulfite process for manufacturing wood-pulp (cellulose). The sulfite lyes may be neutralized.

The process of manufacture consists in intimately mixing calcium cyanamid with sulfite lyes. Apparently the organic compounds present in the sulfite lyes obtained in the manufacture of cellulose act chemically on calcium cyanamid. But nothing can be said as to the nature of the chemical action. That indeed the organic compounds of the sulfite lyes are essential for the formation of the new fertilizer and its actions and that it is not the small quantity of bisulfite of lime which is still in the lyes which produces the action follows from the fact that the favorable action is obtained even when the lyes are neutralized before their employment. For neutralizing them carbonate of lime is preferably employed. As stated above, the sulfite lyes may be neutralized before mixing them with the calcium cyanamid by employing carbonate of lime or the like.

Example 1: 60 kg. calcium cyanamid are intimately mixed with 150 liters of sulfite lye of 14.5° Bé. While constantly agitating the same, 100 liters of lye of 38.5° Bé. are then gradually added. When mixed and left to stand the mass soon becomes solid and so dry that it can be ground. When the stated relative quantities are employed 240 kg. dry new fertilizer are obtained. The fertilizer is distinguished by its acting more rapidly and better than lime nitrogen (calcium cyanamid). Also, the organic substances which are present, as well as the potassium having its origin in the sulfite lyes favor its action.

The concentration of the lye which is first added to the calcium cyanamid may be stronger than 16° Bé., in which event less of the second admixture of the stronger lye will be taken.

Example 2: 65 kg. calcium cyanamid are mixed with 1000 liters of ordinary non-inspissated sulfite lye of 6.5° Bé., whereupon it is preferably heated. It is then left to stand for a long time until no more precipitate is formed. The liquid is then separated from the precipitate and the precipitate washed with water if it is wished completely to remove the residue of the lye.

It is not necessary to separate the precipitate from the liquid, but, on the contrary, the entire mixture may be employed for fertilization.

The chemical changes will be seen from the following analytical results:—100 c. cms. of the original sulfite lye have dissolved in them 10.450 gr. organ. substances, and 100 c. cms. of the treated lye only 3.350 gr., including 0.136 gr. ammonia, so that they still contain 3.214 gr. organ. substances from the lyes.

1000 lt.×104.500 gr.=104,500 kg. organ. sub. in the original lyes.
600 lt.× 32.140 gr.= 19,284 kg. organ. sub. in the treated lyes.

So that 85,216 kg. organ. sub.=81.55% of the original quantity have been precipitated.

In the 600 liters are also contained.

600×1.360 gr.=0.816 kg. ammonia ($NH_3$)
=0.673 kg. nitrogen (N)

On the other hand, the 65 kilograms of calcium cyanamid calculated at 18% N contained 11.760 kilograms of nitrogen, so that 5.72% thereof have been converted into soluble ammonia.

The composition of the fertilizer will naturally vary according to the composition of the lime-nitrogen and the lyes, and according as whether the inspissated lyes are cold or hot. The following show approximate compositions for the use of cold and hot lyes:

|   | Cold. | Hot. |
|---|---|---|
| From the lyes: | 50% dry organic substances slowly soluble in water | 62.5% |
|   | 14.6% CaO | 18.3 |
|   | 0.325 N (as ammonia combinations) | 0.4 |
|   | Some $P_2O_5$ | Some |
|   | 0.65 $K_2O$ | 0.3 |
| From the lime-nitrogen: | 8.5% CaO | 6.0 |
|   | 3.1 N (as ammonia combinations) | 2.5 |
|   | 2.3 finest C | 1.35 |
|   | Also some $SO_2$, $SO_3$, $CO_2$, $H_2O$, etc. |   |

I claim:—

1. As a new article of manufacture, a fertilizer composed of calcium cyanamid and sulfite cellulose lye.

2. As a new article of manufacture, a fertilizer composed of calcium cyanamid, sulfite cellulose waste lye and neutralizing substances.

3. The hereindescribed process of manufacturing a fertilizer, consisting in mixing sulfite cellulose waste lye with calcium cyanamid.

4. The hereindescribed process of manufacturing a fertilizer consisting in neutralizing sulfite cellulose waste lye and mixing the same with calcium cyanamid.

In testimony whereof, I have signed my name to this specification in the presence of two subscribing witnesses.

THEODOR KNÖSEL.

Witnesses:
  FRIDA KLAIBER,
  PAULINE KLAIBER.